Feb. 6, 1940.   J. A. CERNY   2,189,197
SEALING DEVICE
Filed Feb. 26, 1938

INVENTOR.
JOSEPH A. CERNY
BY Woodling & Trost
ATTORNEY.

Patented Feb. 6, 1940

2,189,197

UNITED STATES PATENT OFFICE 2,189,197

SEALING DEVICE

Joseph A. Cerny, Cleveland, Ohio, assignor to The Alpha Engineering Company, Inc., a corporation of Ohio Application February 26, 1938, Serial No. 192,836

1 Claim. (Cl. 286—11)

My invention relates to sealing devices for sealing the shaft opening of a casing and more particularly for sealing the opening in the wall of a casing through which a rotatable shaft extends.

An object of my invention is to provide a good hermetic connection between a rotatable shaft and a casing through a hole of which the rotatable shaft extends.

Another object is to provide a sealing device which maintains a good hermetic seal during rotation of a rotatable shaft extending from a casing.

Another object is to provide a sealing device for sealing the hole in a wall or casing through which a rotatable shaft extends, the sealing device being adapted to maintain a good seal even after wearing of the frictionally engaging parts.

Another object is to provide a sealing device which adapts itself to longitudinal movement of a rotatable shaft so as to maintain a constant hermetic connection therebetween.

Another object is to provide a sealing device which has a bearing ring adapted to continuously press against portions of the rotatable shaft so as to maintain a good seal during any slight longitudinal movement of the shaft and maintain a good seal after wearing of the frictionally engaging parts.

Another object is to provide a good seal for a rotatable shaft extending through a casing which hermetically connects the casing wall and the shaft and prevents gases or fluids form escaping through the shaft opening of the casing.

Another object is to provide a sealing device having the arrangement of parts to maintain a good efficient seal around the rotatable shaft.

A still further object is to provide a sealing device for a rotatable shaft extending through the hole of the wall of the casing which device is efficient in operation and simple in construction so as to afford economy in installation and in maintenance.

Other objects and a fuller understanding of my invention may be had by referring to the following description and claim taken in conjunction with the accompanying drawing, in which:

The problem of providing an efficient seal for a rotatable shaft extending through a hole of a casing so as to prevent leakage of fluid or gases around and out through the hole is well known to those working with the design and construction of apparatus in which it is necessary to extend a rotatable shaft through the wall of a casing. For example, this problem is presented in the construction and operation of refrigerating apparatus, compressors, turbines, engines, and the like. Vibration of the parts and other outside influences causes some longitudinal movement of the rotatable shaft so as to hamper the maintenance of a good seal. As certain parts must frictionally engage by reason of the rotation of the shaft, there is a certain amount of wear and this wearing of the parts also tends to break the desired seal. My invention has its parts so constructed and arranged that there is a continuous hermetic connection between my sealing device and the portion of the shaft upon which it bears so that a hermetic connection is maintained even when there is longitudinal movement of the shaft due to vibration and even when the parts are somewhat worn. The device is adapted to compensate for such longitudinal movement or such wearing of the parts.

Figure 1:
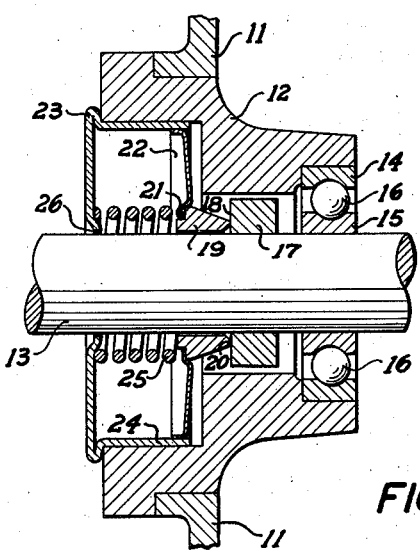
Figure 1 is a cross-sectional view cut axially through the preferred form of my sealing device showing the arrangement of parts around a shaft.

Referring to Figure 1, there is a fragmentary showing of a plate or casing wall 11 which has a flange 12 secured thereto so as to encircle the hole extending through the casing wall 11. As the flange wall is permanently secured to the casing wall 11, the two parts may be spoken of together as the casing wall. The casing wall has a hole extending therethrough, through which hole the shaft 13 is extended. The ends of the shaft not shown are operatively connected to a driving mechanism and a driven mechanism, respectively.

The shaft 13 has an abutment portion 17 which may be formed integrally therewith or may be a collar shrunk upon the shaft 13 so as to be tightly sealed thereon and to rotate with the shaft 13. There is a forward bearing face 18 upon one side of the abutment portion 17. This bearing face 18 is finely ground so as to present a smooth and perfectly level bearing face. The bearing face 18 is preferably made of a hard metal material adapted to resist wear.

The outer ball race 14 is secured to the flange 12 by being pressed therein or otherwise rigidly secured thereto. The inner ball race 15 is tightly secured to the shaft 13 by shrinking or otherwise forcing the race 15 securely to the shaft 13 so as to rotate therewith. The ball-bearings 16 are positioned between the race 14 and the race 15 in the usual manner and provide a good bearing for the shaft 13. The fitting of the parts is such that gases or fluids may leak out around the ball bearings 16 and so escape out from the casing. This is especially true in rayon silk machines in which oil may leak out through and around the ball bearings and escape into the fibers being produced and thus damaging the fibers. The preferred form as shown in Figure 1 is especially adapted for preventing the leakage of oil or vapors out through the wall of a casing.

My device has a sealing ring 19 which is adapted to encircle the shaft 13 and to permit the rotation of the shaft 13 therethrough. The sealing ring 19 is somewhat tapered so that it has a bearing face 20 somewhat smaller than the body of the sealing ring. This bearing face 20 is finely ground and perfectly square so as to engage and hermetically connect with the abutment portion 17 of the shaft 13. The fitting of the bearing face 20 against the ground bearing face 18 of the abutment portion 17 is such that as the abutment portion 17 rotates with the shaft 13, a good hermetic connection is maintained between the sealing ring 19 and the abutment portion 17.

On the side of the sealing ring 19 opposite from the bearing space 20, there is a shoulder 21. The flexible wall member 22 is a metallic annular piece having a central opening through which the shaft 13 may extend. The inner edge portion surrounding this opening is somewhat crimped back so as to engage in the shoulder 21 of the sealing ring 19. The flexible wall member 22 is secured to the sealing ring 19 and hermetically connected thereto by solder or other suitable means. In this way the sealing ring 19 is carried by the flexible wall member 22 and moves with any movement of the inner edge portion of the wall member 22 through which it is attached. In speaking of the inner edge portion of the wall member 22, it is to be understood that this refers to the portion of the wall member 22 adjacent the edge of the opening extending through the wall member 22. In speaking of the outer edge wall portion 22, it is to be understood that this refers to the portion of the wall member 22 adjacent the outer periphery of the wall member 22.
It is seen therefore that the outer edge portion is positioned somewhat radially outwardly from the inner edge portion.

To provide for a suitable mounting and connection of the wall member 22 to the casing wall, I show in the form illustrated in Figure 1, the cup member 23 which has a flat face portion through which the opening 26 extends. The opening 26 is adapted to accommodate the shaft 13 and permit the rotation of the shaft 13 therethrough. The cup member 23 has side portions 24 extending substantially parallel to each other from the forward face portion of the cup member 23 as shown in Figure 1.

The outer edge portion of the wall member 22 is secured to and hermetically connected to the side portions 24 of the cup member 23 by soldering or other suitable means so as to provide a good seal between the wall member 22 and the side portions 24 of the cup member 23. The cup member 23 is adapted to be secured to the casing wall by having the side portions 24 driven or pressed into the opening of the casing wall so that the side portions 24 are in tight engagement with, and hermetically connected with, the casing wall at the hole extending therethrough. It is therefore seen, as shown in Figure 1, that the cup member 23 is hermetically connected with the casing wall and that the wall member 22 is thereby hermetically connected to the casing wall. In this manner fluids or gases are prevented from escaping around the periphery of the wall member 22 and the opening through the casing wall is effectively closed and sealed.

The wall member 22 is constructed of a thin metal disc and has its diameter shrunk so as to bulge out the portions intermediate of the outer edge portions. This bulging out of the wall member 22 is illustrated in the views of the drawing. The disc distorted by the compression of its diameter is therefore so bulged as to have the outer edge portions disposed in a different radial plane than the radial planes in which the intermediate portions are disposed. In the view of Figure 1, the wall member is bulged so as to be inclined, from the outer edge portions to the inner edge portions. In the other views the bulge is such as to be slopingly curved from the outer edge portions to the inner edge portions.

The nature of the construction and material of the wall member is such that it is adapted to resiliently flex to permit a resilient action of the inner edge portions. This resilient flexing action may be analogously compared to the snapping action of the bottom of the conventional oil dispensing can in which oil is dispensed by pressing and releasing the central part of the bottom surface of the can. This same flexibility and resiliency is to be found in wall member 22 so that the inner edge portions may move axially of the shaft 13 while the position of the outer edge portions remains the same. The flexibility and resiliency thus provided tends to hold the sealing ring 19 secured to the inner edge portions against the abutment portion 17 to maintain a continuous hermetic connection between the bearing face 18 and the bearing face 20.

The wall member 22 may be given a sufficient amount of resiliency so that the sealing ring 19 is continually urged against the abutment portion 17. However, it may be advisable to supply auxiliary resilient means to aid in the urging of the sealing ring 19 against the abutment portion 17. It may also be arranged that the wall member 22 will not have sufficient resiliency to permit all of the desired movement of the sealing ring 19 as may be required. A coil spring 25 is therefore provided in the modification in the preferred form as shown in Figure 1 which is adapted to press against the sealing ring 19 so as to urge it away from the flat face portion of the cup member 23. The resiliency of the coil spring 25 encircled around the shaft 13 within the cup member 23 is such that it has one end pressing against the inner side of the flat forward face of the cup member 23 and has its other end pressing against the sealing ring 19. The expansibility of the coil spring 25 is such that the inner edge portion of the wall portion 22 and the sealing ring 19 secured thereto is pressed toward the abutment portion 17 so that a good hermetic connection is continuously maintained between the sealing ring 19 and the abutment portion 17. This urging of the seal ring 19 toward the abutment portion 17 will permit slight axial movement of the shaft 13 while maintaining a good hermetic connection and will also take up any wear caused by the frictional engagement of the sealing ring 19 against the abutment portion 17 so as to maintain a good hermetic connection after wearing of these parts.

Figure 2:
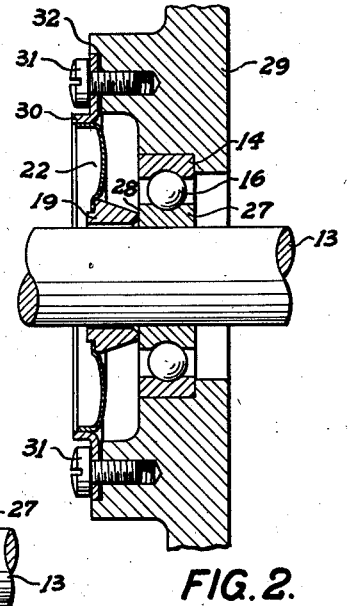
Figure 2 is another cross-section view of a modified form of my sealing device.

In Figure 2, I show a somewhat modified form of my sealing device. In the arrangement shown, the inner ball race for the ball bearings 16 is formed so as to have a perfectly flat ground surface 28 and by reason of this distinction, the inner ball race is denoted by the reference character 27. The sealing ring 19 in the arrangement shown in Figure 2 bears against the inner ball race 27 against the surface 28 of the ball race 27. In this form of my sealing device, the abutment portion 17 is not utilized and the inner ball race 27 is used in its stead, but in the claim, it may also be referred to as an abutment portion or as part of the shaft.

In the modification shown in Figure 2, the casing wall has a different flange portion which flange portion is denoted by the reference character 29. A shaft 13 extends through a hole in the flange portion 29 of the casing wall. The outer ball race 14 is secured by pressing or other suitable means so as to rigidly secure it to the flange portion 29.

The outer edge portion of the flexible wall member 22 is secured to, and hermetically connected to, an annular member 30 by solder or other suitable metallic adhesion means so as to provide a good seal between the outer edge portion of the wall member 22 and the annular member 30. The annular member 30 is securely mounted to the flange portion 29 by means of a number of screw bolts 31. The washer element 32 placed between the annular member 30 and the flange portion 29 seals the connection between the annular member 30 and the flange portion 29 so as to provide a good seal. In this manner, the outer edge portion of the wall member 22 is mounted to, and hermetically connected to, the flange portion 29 of the casing wall. In the form shown in Figure 2, a coil spring is not utilized, as the wall member 22 is given such resiliency as required to urge the sealing ring 19 towards the inner ball race 27 thus maintaining a good hermetic connection therebetween. The resilient flexing action of the wall member 22 and the arrangement of the parts is such that the sealing ring 19 follows any slight axial movement of the shaft 13 and also adapts itself to any wear occurring by reason of the frictional engagement of the sealing ring 19 and the inner ball race 27.

Figure 3:
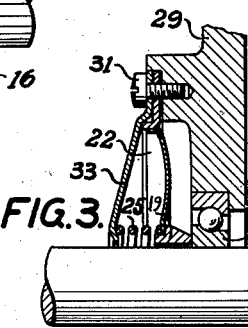
Figure 3 is a fragmentary view showing a portion of the device shown in Figure 2 with a different arrangement of parts to provide a resilient spring action.

In Figure 3, I illustrate a portion of the form shown in Figure 2 but have added thereto auxiliary resilient means adapted to press against the sealing ring 19. The coil spring 25 encircling the shaft 13 is added to afford an auxiliary resilient action against the sealing ring 19. A saucer plate 33 is provided to afford a backing against which the coil spring 25 is based so that one end of the coil spring 25 presses against the saucer plate member 33 and the other end of the coil spring 25 effectively presses against the sealing ring 19. The saucer plate member 33 is secured to the flange portion 29 by means of the screw bolts 31 utilized for mounting the annular member 30 to the flange portion 29.

Figures 4, 5:
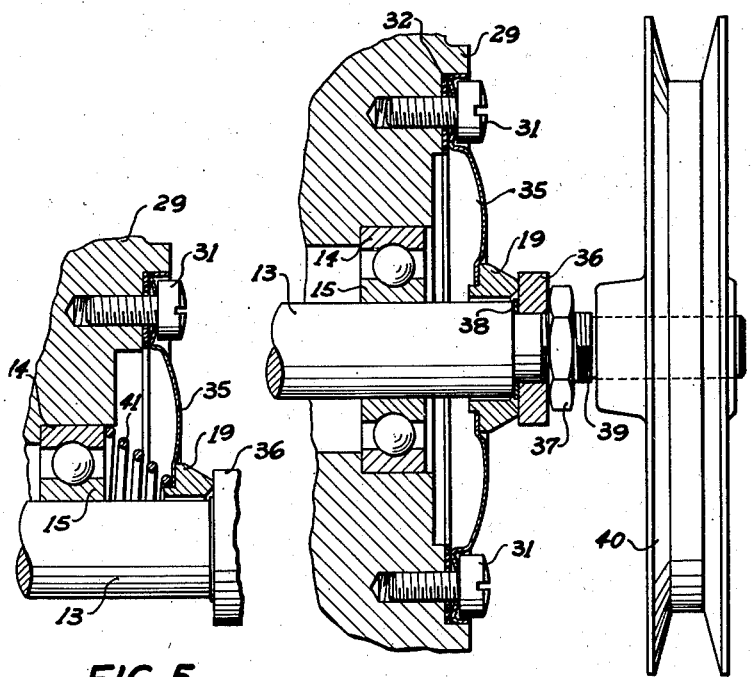
Figure 4 is another cross-sectional view taken through another modified form of my sealing device; and shows the device in relationship to a shaft and the driving pulley mounted on the shaft.
Figure 5 is a fragmentary view of a device somewhat similar to that shown in Figure 4 but with a different arrangement of parts and in which the resilient action of a spring is provided.

Figure 4 illustrates another modified form of my sealing device and in this arrangement of parts, the shaft 13 has an abutment portion 36 rigidly secured to the shaft 13 by the nut 37 threadably secured to the threaded portion 39 of the shaft 13. The driving pulley 40 is shown as secured to the one end of the shaft 13 by suitable means. There is a washer element 38 provided between the abutment portion 36 and the shaft 13 so as to make a good seal therebetween.

In order to provide a good hermetic connection with the abutment portion 36, which is arranged in a different relative position from that of the abutment portion 17 shown in Figure 1, the sealing ring 19 is reversed so that its bearing face portion is directed against the abutment portion 36. The outer edge portion of the wall member 35 is extended somewhat radially outward as shown in Figure 4 and has a circumferential rim or wave bent therein so that the screw bolts 31 tightened down thereon securely engage the outer edge portion of the wall member 35 to the flange portion 29 and with the aid of the washer element 32 forms a good hermetic connection between the wall member 35 and the flange portion 29 of the casing wall. The wall member 35 has the same resilient flexibility as the wall member 22 and is adapted to press the sealing ring 19 tightly against and in good hermetic connection with, the abutment portion 36. In the form shown in Figure 4, the wall member 35 has resiliency sufficient to keep the sealing ring 19 in close engagement with the abutment portion 36 and the requirements of the particular use to which it is put does not require auxiliary resilient means.

In Figure 5, however, I show auxiliary resilient means which is afforded by the coil spring 41 formed in a conical structure having one end of the coil spring 41 tightly pressing against the sealing ring 19 to urge it against the abutment portion 36 and having the other end resting against the outer ball race 14. In some uses, the resiliency of the wall member 35 is sufficient to give the forward urging action of the sealing ring 19 against the abutment portion 36 and in other requirements, the use of the coil spring 41 is desirable so as to give a more urgent pressing action. It is, of course, obvious that the coil spring utilized may press against the inner edge portion of the wall member or directly against the sealing ring, but as these two are directly connected together, the action is the same and it may be said in either arrangement, that the coil spring presses against the sealing ring.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

A unitary cartridge sealing device for sealing a hole in a casing having a shaft therein, said shaft having an abutment portion thereon, comprising, in combination, a stamped metal cupped-shaped housing adapted for hermetic and press fit into the hole and provided with a peripheral shoulder portion to limit the insertion of the housing into the hole, a relatively large flexible disk-like member having a central opening through which the shaft may extend and having its outer peripheral edge portion provided with a cylindrical flange telescoping with and hermetically connected to the housing at the open end thereof by metallic adhesion means, a sealing ring carried by the inner peripheral edge of the disk-like member and adapted to hermetically engage the abutment on the shaft, and resilient means mounted in the housing for urging the sealing ring axially of the shaft against the abutment, the disk-like member being free for flexing throughout its entire radial extent to provide for a relatively large axial movement of the sealing ring without undue strain in the disk-like member.

JOSEPH A. CERNY.